United States Patent
Zhou et al.

(10) Patent No.: US 6,392,365 B1
(45) Date of Patent: May 21, 2002

(54) HOT RESTRIKE PROTECTION CIRCUIT FOR SELF-OSCILLATING LAMP BALLAST

(75) Inventors: Rui Zhou, Clifton Park; Mustansir Hussainy Kheraluwala, Schenectady, both of NY (US); Louis Robert Nerone, Brecksville, OH (US); Weizhong Tang, Boxborough, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,869

(22) Filed: Jun. 20, 2001

(51) Int. Cl.$^7$ ................................................. G05F 1/00
(52) U.S. Cl. ..................... 315/291; 315/244; 315/226; 315/209 R; 315/DIG. 7
(58) Field of Search ................................ 315/291, 219, 315/244, 226, 224, DIG. 4, DIG. 7, 278, 360

(56) References Cited

U.S. PATENT DOCUMENTS

| | | | |
|---|---|---|---|
| 4,455,510 A | * 6/1984 | Lesko | 315/263 |
| 4,996,464 A | * 2/1991 | Dodd et al. | 315/289 |
| 5,317,237 A | * 5/1994 | Allison et al. | 315/307 |
| 5,550,436 A | * 8/1996 | Houk | 315/209 R |
| 5,796,214 A | 8/1998 | Nerone | 315/209 R |
| 5,877,595 A | 3/1999 | Nerone | 315/209 R |
| 5,910,708 A | 6/1999 | Nerone | 315/209 R |
| 5,917,289 A | 6/1999 | Nerone et al. | 315/209 R |
| 5,939,834 A | 8/1999 | Nerone | 315/209 R |
| 5,952,790 A | 9/1999 | Nerone et al. | 315/209 R |
| 5,965,985 A | 10/1999 | Nerone | 315/DIG. 4 |
| 6,051,934 A | 4/2000 | Nerone | 315/209 R |
| 6,175,198 B1 | 1/2001 | Nerone | 315/291 |

* cited by examiner

*Primary Examiner*—Haissa Philogene
(74) *Attorney, Agent, or Firm*—Jill M. Breedlove; Christian G. Cabou

(57) ABSTRACT

A hot restrike protection circuit provides complete shut down protection for a self-oscillating high intensity discharge lamp ballast of the type comprising a pair of complementary switching devices in a bridge configuration with a gate drive inductor in series with a second inductor, i.e., a control inductor, at the junction between the switching devices. The hot restrike protection circuit effectively comprises a three-terminal device for coupling across the control inductor. In particular, the HRP circuit comprises a sensing network for sensing voltage across the control inductor, a breakdown network for providing a breakdown path upon reaching a predetermined restrike voltage threshold across the control inductor, and a shutdown network for shutting down operation of the ballast until the lamp is sufficiently cool for restarting, thereby protecting ballast components during hot restrike, or re-ignition, of the lamp.

14 Claims, 4 Drawing Sheets

HOT RESTRIKE PROTECTION CIRCUIT FOR SELF-OSCILLATING LAMP BALLAST

BACKGROUND OF INVENTION

Cold ignition and hot re-ignition of high intensity discharge (HID) lamps, particularly ceramic metal halide (CMH) lamps, have very different operational characteristics and requirements. In order to start a cold CMH lamp, a ballast needs to deliver high voltage pulses (e.g., about 2000 volts) to ionize the gas to initiate the arc discharge between the electrodes. Immediately following initiation of the arc discharge, or breakdown, the lamp enters a glow mode, during which the lamp voltage is still relatively high, e.g., on the order of a few hundred volts. Subsequently, the lamp transitions from the glow mode to an arc mode, during which the arc warms up to reach its steady-state discharge voltage, e.g., on the order of 100 volts.

In order to re-ignite, or restrike, a thermally hot lamp, much more energy is required; thus, the breakdown voltage is much higher, e.g., greater than 10,000 volts. During hot restrike, if there is no protection circuit, the self-oscillating ballast can continuously deliver excessively high voltage pulses to the lamp until the electrical stresses exceed the limitations of the ballast, leading to destruction of critical semiconductor components.

Accordingly, it is desirable to provide robust protection circuitry for self-oscillating lamp ballasts for protecting ballast components during hot re-ignition, or restrike, of the lamp.

SUMMARY OF INVENTION

A hot restrike protection (HRP) circuit provides shut down protection for a self-oscillating high intensity discharge (HID) lamp ballast of the type comprising a pair of complementary switching devices in a bridge configuration with a gate drive inductor in series with a second, or control, inductor at the junction between the switching devices. The HRP circuit effectively comprises a three-terminal device for coupling across the control inductor. In particular, the HRP circuit comprises a sensing network for sensing voltage across the control inductor, a breakdown network for providing a breakdown path upon reaching a predetermined restrike voltage threshold across the control inductor, and a shutdown network for shutting down operation of the ballast until the lamp is sufficiently cool for restarting, thereby protecting ballast components during hot restrike, or re-ignition, of the lamp.

DETAILED DESCRIPTION

Figure 1:
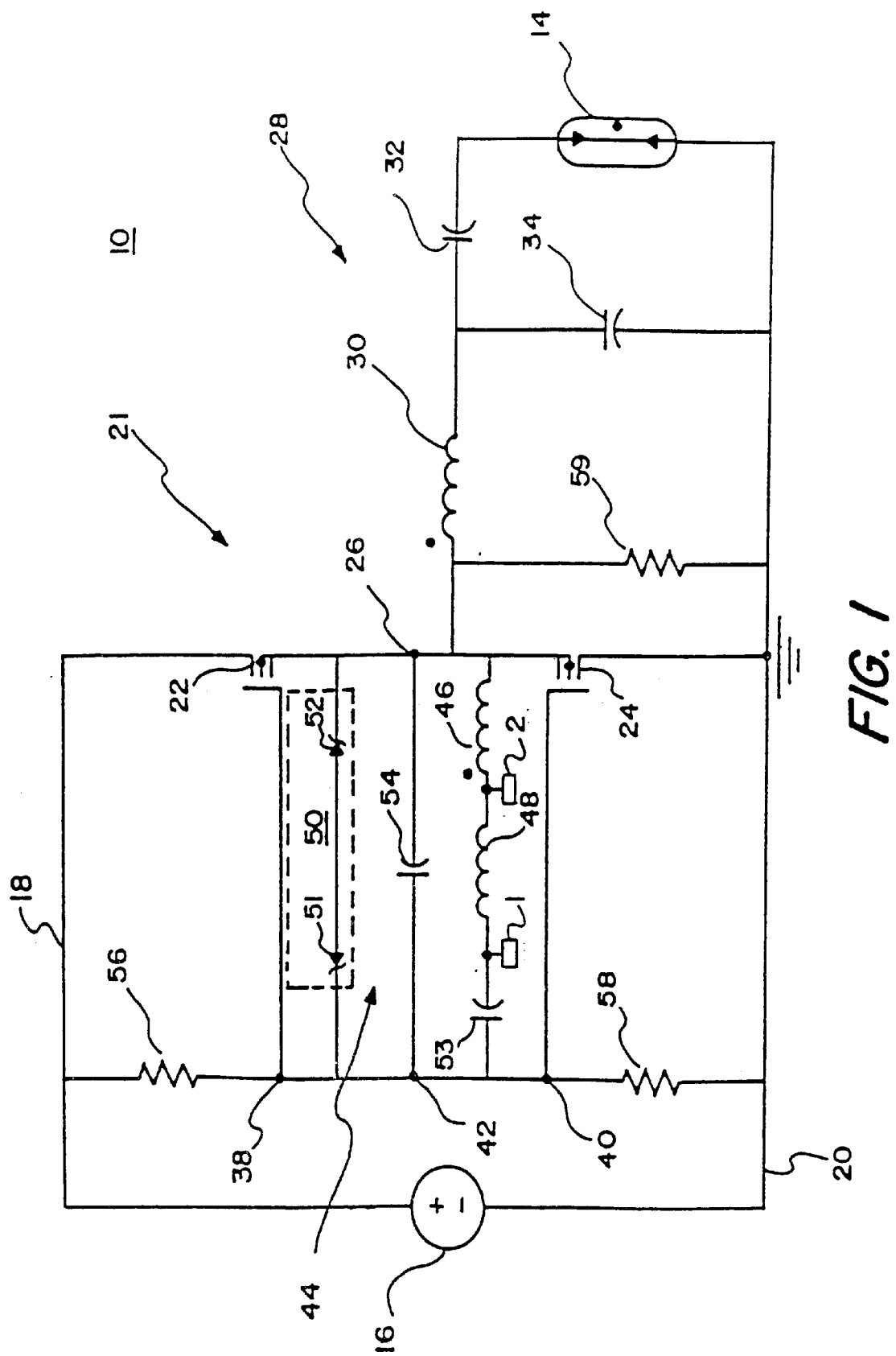
FIG. 1 schematically illustrates a complementary self-oscillating ballast for a CMH lamp.

FIG. 1 illustrates a self-oscillating ballast circuit 10 suitable for operating a high intensity discharge lamp 14 (e.g., a CMH lamp) powered from a dc bus voltage generated by a dc source 16. The dc bus voltage exists between a bus conductor 18 and a reference conductor 20. Ballast 10 comprises a dc-to-ac converter, or inverter, 21 for converting the voltage on bus conductor 18 to an ac voltage suitable for igniting an arc in the discharge tube of lamp 14 and to maintain the arc after ignition thereof. Specifically, to initiate the arc in the discharge tube of lamp 14, ballast 10 generates a periodic series of voltage pulses, which pulses are applied across the discharge tube electrodes (not shown).

Converter 21 is shown as comprising switching devices 22 and 24 connected in series between conductors 18 and 20. In the illustrated embodiment, switching devices 22 and 24, respectively, comprise n-channel and p-channel enhancement mode MOSFET's, respectively, with their source electrodes connected together at a common node 26. The switching devices may comprise other devices having complementary conduction modes, such as pnp and npn bipolar junction transistors, for example. A resonant load circuit 28 coupled at the output of inverter 21 comprises a resonant inductor 30 and a resonant capacitance 32, 34 for setting the frequency of resonant operation. Capacitor 32 also serves as a dc blocking capacitor.

Switching devices 22 and 24 cooperate to provide ac current from common node 26 to resonant inductor 30. The gate, or control, electrodes 38 and 40, respectively, of switching devices 22 and 24, respectively, are interconnected at a control node 42. Gate drive circuitry 44 is connected between control node 42 and common node 26 for implementing regenerative control of switching devices 22 and 24. A gate drive inductor 46 is mutually coupled to resonant inductor 30 for inducing in inductor 46 a voltage proportional to the instantaneous rate of change of current in resonant load circuit 28. A second inductor, or control inductor, 48 is connected in series with inductor 46 between common node 26 and control node 42.

A bi-directional voltage clamp 50 is connected between nodes 26 and 42, e.g., comprising back-to-back Zener diodes 51 and 52. The voltage clamp cooperates with second inductor 48 in such manner that the phase angle between the fundamental frequency component of voltage across the resonant load circuit and the ac current in resonant inductor 30 approaches zero during lamp ignition. As shown, a dc blocking capacitor 53 may be connected in series with inductors 46 and 48, i.e., between nodes 26 and 42.

As illustrated, a capacitor 54 is preferably provided between nodes 26 and 42 for limiting the rate of change of control voltage therebetween. In this way, a dead time interval is provided during switching of devices 22 and 24 wherein both switching devices are off.

Resistors 56 and 58 are provided in series between conductors 18 and 20 for operating with a resistor 59 in order to start regenerative operation of gate drive circuitry 44. In particular, during the start-up process, capacitor 53 is initially charged upon energizing source 16 via resistors 56, 58 and 59. At that time instant, the voltage across capacitor 53 is zero; and during the starting process, inductors 46 and 48 act essentially as a short circuit as a result of the relatively long time constant for charging capacitor 53. For resistors 56, 58 and 59 of substantially equal value, for example, the voltage on common node 26 is initially approximately one-third of bus voltage 18. In this manner, capacitor 54 becomes increasingly charged until it reaches the threshold voltage of the gate-to-source voltage of switching device 22 (e.g., 2–3 volts). At this point, switching device 22 switches into its conduction mode, resulting in current being supplied by switching device 22 to the resonant load circuit. In turn, the resulting current in the resonant load circuit causes regenerative control of switching devices 22 and 24. The ballast thus excites the resonant load circuit 28 to provide a pulsed output voltage, which is applied to the lamp for igniting an arc discharge therein.

During steady-state operation of ballast 10, the voltage at common node 26 becomes approximately one-half of bus voltage 18. The voltage at node 42 also becomes approximately one-half that of bus voltage 18 so that capacitor 53 cannot again, during steady-state operation, become charged so as to again create a starting pulse for turning on switching device 22. During steady-state operation, the capacitive reactance of capacitor 53 is much larger than the inductive reactance of gate drive inductor 46 and second inductor 48, such that capacitor 53 does not interfere with operation of inductors 46 and 48.

Figure 2:
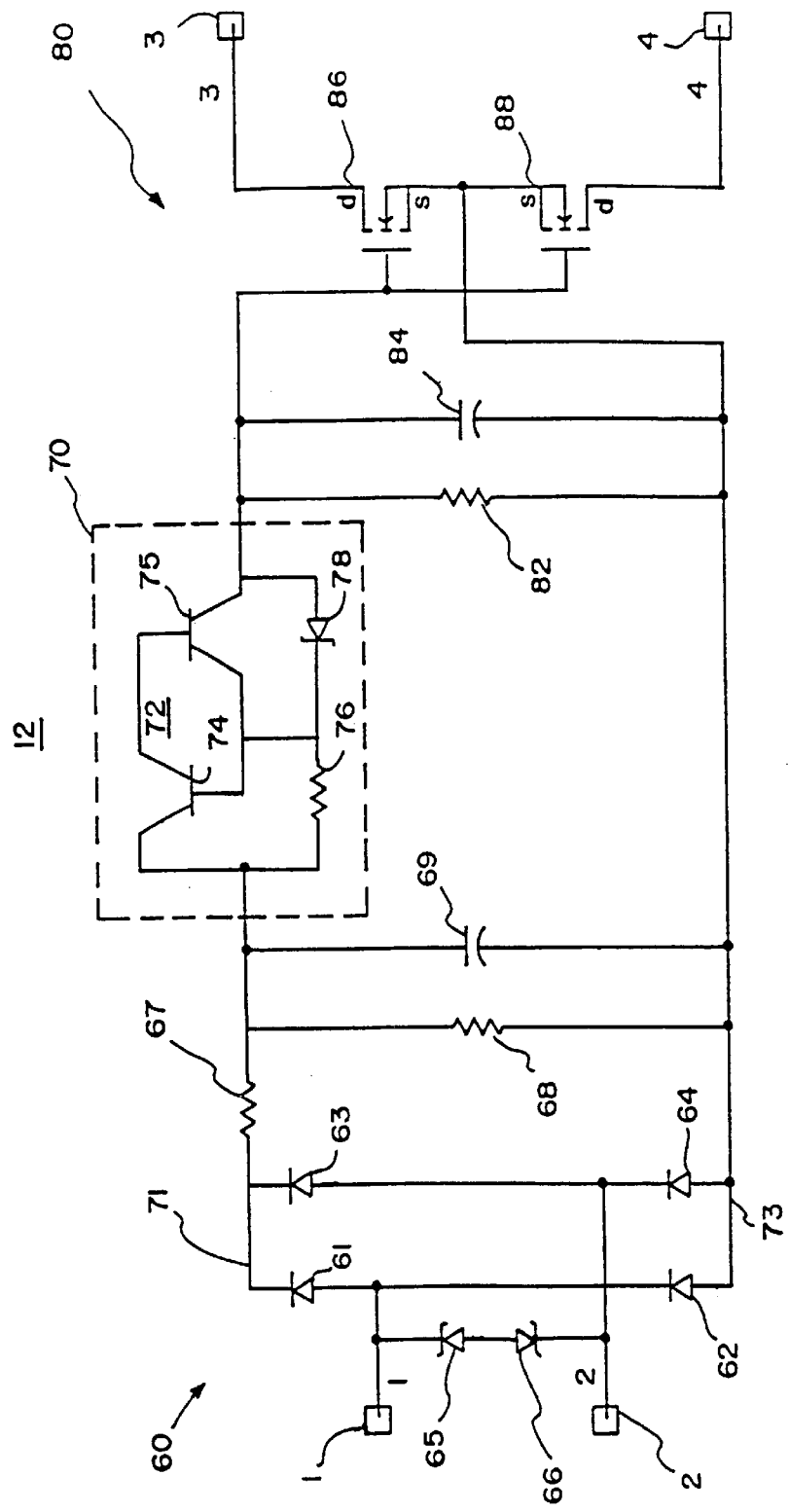
FIG. 2 schematically illustrates a prior art hot restrike protection circuit.

FIG. 2 illustrates a known hot restrike protection (HRP) circuit 12 useful with a ballast, such as that of FIG. 1, for avoiding application of an undesirably high voltage to the discharge tube of lamp 14 during a hot restrike, i.e., a hot restart. The hot restrike protection circuit comprises a sensing network 60, a breakdown network 70, and a shutdown network 80.

Sensing network 60 comprises a bridge configuration of diodes 61–64 coupled between conductors 71 and 73 with junctions 1 and 2, respectively, joining the diode pairs 61–62 and 63–64, respectively, of the bridge; a pair of back-to-back Zener diodes 65 and 66 connected in series between nodes 1 and 2; a resistor 67 connected between diode bridge 61–64 and the breakdown network 70, a resistor 68 connected between the sensing network and the conductor 73; and a capacitor 69 coupled across resistor 68. The back-to-back Zener diodes 65 and 66 limit the voltage across HRP circuit 12, as desired, depending on the breakdown voltage values of the Zener diodes.

Breakdown network 70 comprises a latching device 72, e.g., comprising complementary transistors 74 and 75. Transistor 74 is shown as a pnp device, and transistor 75 is shown as an npn device, transistors 74 and 75 being coupled such that the base of each is connected to the collector of the other. A resistor 76 is coupled between the base and emitter of transistor 74; and a Zener diode 78 is coupled between the base and emitter of transistor 75.

Shutdown network 80 comprises: a parallel combination of a resistor 82 and a capacitor 84 coupled between breakdown network 70 and conductor 73; and two N-channel MOSFET's 86 and 88 coupled with their gates and sources respectively connected together. The drain of MOSFET 86 is at a node 3, and the drain of MOSFET 88 is at a node 4.

In operation of HRP circuit 12, nodes 1 and 3 are connected together, and nodes 2 and 4 are connected together, the resulting two-node device being connected across inductor 48 (FIG. 1) for performing both the sensing and shutdown functions. In particular, HRP circuit 12 is designed to activate when a voltage higher than a predetermined value exists across inductor 48 for a certain time period. Such situations may occur, for example, when a lamp is removed from the circuit or when end-of-life effects cause a lamp to overheat, especially at lamp electrodes, for example. HRP circuit 12 senses voltage across inductor 48 via nodes 1–2 and nodes 3–4, which voltage is rectified by rectifier bridge 61–64 and then used to charge capacitor 69. When the voltage on capacitor 69 exceeds the breakdown voltage of Zener diode 78, current flows in the path formed by Zener diode 78 and resistor 76, activating latch 72. Activation of latch 72 causes the voltage across inductor 48 to drop, which in turn increases the frequency of ballast circuit 10 beyond the resonant frequency of resonant circuit 28. The increase in circuit frequency, in turn, results in decreased current supplied to lamp 14.

Latch 72 is designed with complementary transistors 74 and 75 such that there is a direct coupling feedback between the transistors. The feedback is positive since a change in current at any point in the latch circuit loop is amplified and returned to the starting point with the same phase. Latch 72 operates in one of two states at any time, open or closed. When latch 72 is in an open state, it stays open until an input current forces it to close. If it is in a closed state, then it continues operating in that state until an input current or a drop in system voltage forces it to open.

One way to close latch 72 is by providing a trigger pulse to the base of transistor 74, momentarily forward biasing its base. Since there is a large positive feedback, the returning amplified current is much larger than the original input current. At this point, the collector of transistor 75 supplies base current to transistor 74, and the trigger pulse is no longer needed. This action is regenerative feedback because once started, the action sustains itself. The regenerative feedback quickly drives both transistors into saturation, at which point the loop gain drops to unity.

One way to open latch 72 is by applying a negative trigger pulse to the base of transistor 74, pulling transistor 75 out of saturation. Once this occurs, regeneration takes over and quickly drives the transistors to cutoff. Another way to open latch 72 is by a low current dropout. This occurs by sufficiently reducing the voltage across the sense terminals 1, 2 of the HRP circuit of FIG. 2 so that transistors 74 and 75 come out of saturation and transition to a cutoff state.

There is some delay between the occurrence of a high-voltage state and activation of latch 72. Particularly, the time needed to charge capacitor 84 provides a time delay from the occurrence of a high voltage until latch 72 is activated. Additionally, the breakdown voltage of Zener diode 78 determines the high voltage value at which HRP circuit 12 will allow triggering of latch 72.

When switching devices 86 and 88 of HRP circuit 12 are turned on to short-circuit the gate inductor 48, HRP circuit 12 attempts to stop the gate resonance so as to extinguish the gate drive voltage and thus turn off the ballast inverter. Disadvantageously, however, even though inductor 48 is short-circuited, the secondary leakage inductance of resonant transformer 28, which is in series with inductor 48, tends to maintain the gate resonance. Hence, the ballast inverter cannot be completely shut down, such that ballast circuit components are not completely protected.

Figure 3:
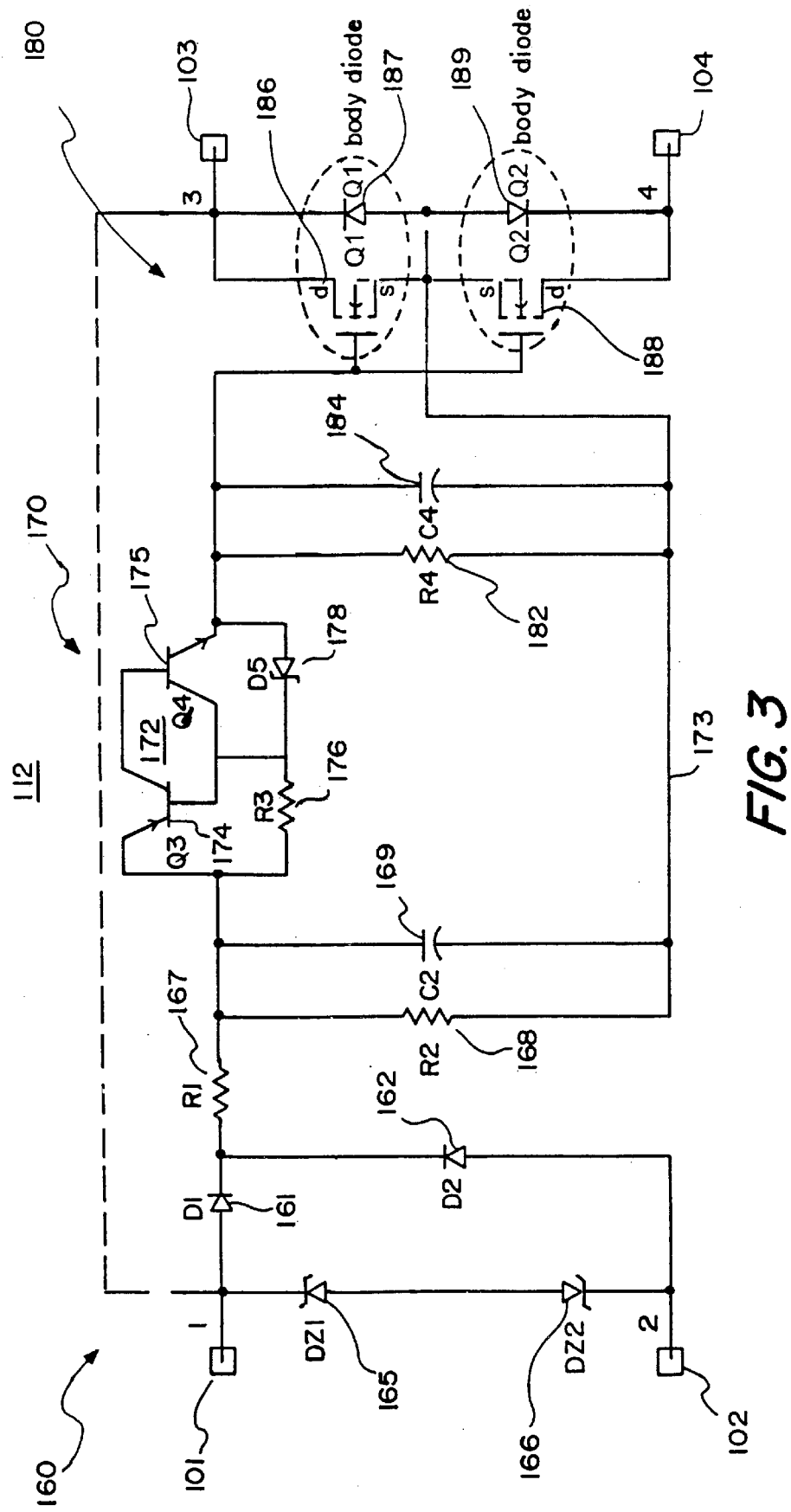
FIG. 3 schematically illustrates an exemplary embodiment of a hot restrike protection circuit in accordance with the present invention.

FIG. 3 illustrates a preferred embodiment of an HRP circuit 112, which advantageously operates to completely turn off the ballast inverter during hot restrike operation. HRP circuit 112 comprises a sensing network 160, a breakdown network 170, and a shutdown network 180. Sensing network 160 comprises: a pair of back-to-back Zener diodes 165 and 166 connected in series between nodes 101 and 102; a diode 161 connected between node 101 and a resistor 167; a diode 162 having its cathode connected to the cathode of diode 161 and its anode connected to node 102; and the parallel combination of a resistor 168 and a capacitor 169 connected between the junction joining resistor 167 and breakdown network 170, the other terminal being connected to conductor 173.

Breakdown network 170 comprises a latching device 172, e.g., comprising complementary transistors 174 and 175. Transistor 174 is shown as a pnp device, and transistor 175 is shown as an npn device, transistors 174 and 175 being coupled such that the base of each is connected to the collector of the other. A resistor 176 is coupled between the base and emitter of transistor 174; and a Zener diode 178 is coupled between the base and emitter of transistor 175.

Shutdown network 180 comprises: a parallel combination of a resistor 182 and a capacitor 184 coupled between breakdown network 170 and conductor 173; and two N-channel MOSFET's 186 and 188 coupled with their gates and sources respectively connected together. The drain of MOSFET 186 is at a node 103, and the drain of MOSFET 188 is at a node 104. FIG. 3 also illustrates an integral body diode 187 of device 186 and an integral body diode 189 of device 188. Body diodes 187 and 189 advantageously operate with diodes 161 and 162 in performing the sensing function, thereby reducing the number of circuit components as compared with FIG. 2.

HRP circuit 112 is used with ballast 10 of FIG. 1 with nodes 101 and 103 connected to each other and to the junction between capacitor 53 and inductor 48. However, nodes 102 and 104 are not connected together; node 102 is connected to the junction between inductors 48 and 46, and node 104 is connected to the midpoint of the ballast inverter, i.e., the junction between switching devices 22 and 24. As a result, HRP circuit 112 is effectively a three-terminal device, which separates the sensing and shutdown nodes and functions.

Advantageously, in operation of HRP circuit 112, when switching devices 186 and 188 of the HRP shutdown circuit 180 are activated, the total gate resonant inductance, including the secondary leakage inductance, is effectively short-circuited, thereby extinguishing the gate resonance and completely turning off the ballast inverter.

HRP circuit 112 operates to limit the amplitude of the output voltage that is applied by the inverter to the discharge tube of the lamp (e.g., to approximately 2.0 kV). In addition, HRP circuit 112 in combination with the main ballast provides the output voltage as a burst of pulses (e.g., 2.0 kV) for a short duration (e.g., about 50 microseconds) with a predetermined interval (e.g., 1 second) between these bursts of pulses. The periodic bursts of pulses are continued while the lamp has sufficiently cooled until the lamp is capable of being ignited, at the cold start voltage of approximately 2 kV.

HRP circuit 112 comprises RC networks which ensure effective shutdown during hot restrike ignition and furthermore determine the restrike time without interfering with standard lamp warm up. Because the magnitude of the high voltage pulses needed during typical lamp warm up operation is much shorter than the magnitude of pulses needed during hot restrike, the RC circuit comprising resistor 168 and capacitor 169 is designed such that the voltage across capacitor 169 cannot build up to the breakdown voltage of Zener diode 178 during standard lamp warm up, ensuring that HRP circuit 112 will not affect warm up ignition. The values of resistor 168 and capacitor 169 are thus selected depending on the desired restrike pulse width. Additional RC circuits (resistor 168, capacitor 169; and resistor 182, capacitor 184) are designed to control the time interval between restrike pulses. Once the discharge tube of lamp 14 has cooled sufficiently for an arc to be ignited by a restrike pulse of magnitude approximately equal to that required for cold start, then ignition of the arc will occur. If the discharge tube has not cooled sufficiently for an arc to be re-ignited at the cold start voltage, then the tube will continue to cool and another restrike pulse will be applied after a predetermined interval.

During hot restrike, the voltage across capacitor 169 is greater than the breakdown voltage of Zener diode 178, and the voltage across resistor 176 begins increasing. When the voltage across resistor 176 exceeds a predetermined value (e.g., 0.7V), then switching devices 174 and 175 turn on. The base current of device 174 is amplified and supplies the base of device 175; and the base current of device 175 is amplified and supplies the base of device 174. Hence, devices 174 and 175 are latched, and the voltage drop across devices 174 and 175 is nearly zero. In this way, capacitor 184 senses the voltage across capacitor 169. At a threshold voltage across capacitor 169, devices 186 and 188 turn on, shorting out the gate resonant circuit 44, which in turn shuts down the ballast 10.

After the ballast shuts down, capacitor 169 discharges through resistor 168, and capacitor 184 discharges through resistor 182. When the voltage across capacitor 184 decreases below the threshold voltage of devices 186 and 188, devices 186 and 188 turn off, thus releasing the gate resonant circuit, and the ballast begins oscillating again. At this time, if the CMH lamp is cool enough, the ballast starting voltage (e.g., approximately 2 kV) will be high enough to ignite the lamp before being shut down by HRP circuit 112 a second time. However, if the CMH lamp is still hot, then the ballast will shut down again, and operation continues as above until the lamp is sufficiently cool for restarting.

Figure 4:
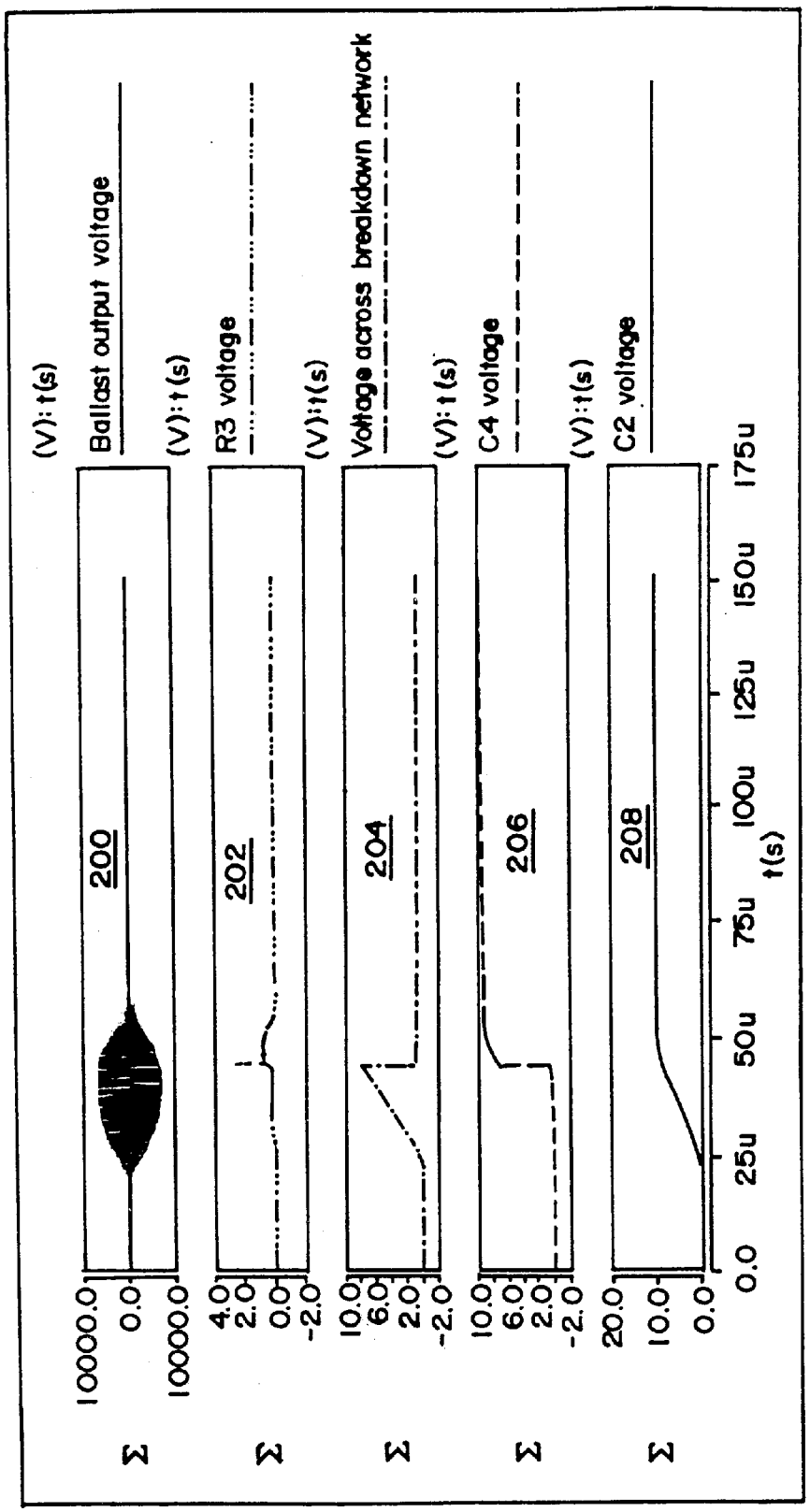
FIG. 4 graphically illustrates simulation results for the HRP circuit of FIG. 3.

FIG. 4 illustrates simulation results for HRP circuit 112 as follows: ballast output voltage 200; voltage 202 across resistor 176; voltage 204 across breakdown network 170; voltage 206 across capacitor 184; and voltage 208 across capacitor 169.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In a self-oscillating lamp ballast of the type comprising a switching converter having switching devices in a bridge configuration, and further comprising a control inductor in a gate drive circuit for driving the converter, a hot restrike protection circuit, comprising:

a sensing network comprising sensing circuitry coupled between first and second terminals for sensing voltage across the control inductor;

a breakdown network comprising latch circuitry coupled between the sensing network and a shutdown network;

the shutdown network being coupled to the latch circuitry comprising switching circuitry coupled between third and fourth terminals;

the hot restrike protection circuit being coupled across the control inductor with the first and third terminals thereof being coupled together and to one terminal of the control inductor, the second terminal being connected to the other terminal of the control inductor, and the fourth terminal being connected to a junction joining the switching devices of the converter; the breakdown network being activated when the sensing network senses a voltage across the control inductor in excess of a predetermined threshold voltage, the shutdown network being activated by turning on the switching circuitry thereof when a second predetermined threshold voltage is exceeded in order to provide restsrike pulses for re-activating the lamp, thereby short-circuiting the control inductor and de-activating the converter until the lamp is sufficiently cool to re-activate the lamp.

2. The hot restrike protection circuit of claim 1 wherein the sensing network comprises a diode rectifier network.

3. The hot restrike protection circuit of claim 1 wherein the sensing network comprises a pair of diodes coupled together at their cathodes and further coupled such that the anode of one is coupled to the first terminal and the anode of the other is coupled to the second terminal, the sensing network further comprising integral body diodes of the switching circuitry.

4. The hot restrike protection circuit of claim 1 wherein the breakdown network comprises a latching device, comprising two complementary transistors coupled such that the base of each is connected to the collector of the other, and further comprises a Zener diode and resistor connected in series with each other, the series combination of the Zener diode and resistor being coupled across the latching device.

5. The hot restrike protection circuit of claim 1 wherein the shutdown circuit comprises a pair of switching devices in a half-bridge configuration between the third and fourth terminals, and further comprises an RC circuit.

6. The hot restrike protection circuit of claim 1, further comprising an RC circuit for providing a time delay before activation of the latching network in order to avoid activating the shutdown network during standard lamp warm up.

7. The hot restrike protection circuit of claim 1, further comprising timing circuitry for controlling the time interval between restrike pulses.

8. A self-oscillating ballast for a lamp, comprising:

a resonant load circuit comprising a resonant inductance and a resonant capacitance;

an inverter coupled to the resonant load circuit for inducing an ac current in the resonant load circuit, the inverter comprising a pair of complementary switching devices in a half-bridge configuration with a control inductor coupled to a junction between the switching devices;

gate drive circuitry for driving the inverter, the gate drive circuitry comprising a gate drive inductor coupled to the resonant inductor;

a hot restrike protection circuit comprising: a sensing network comprising sensing circuitry coupled between first and second terminals for sensing voltage across the control inductor, a breakdown network comprising latch circuitry coupled between the sensing network and a shutdown network; the shutdown network being coupled to the latch circuitry comprising switching circuitry between third and fourth terminals; the hot restrike protection circuit being coupled across the control inductor with the first and third terminals thereof being coupled together and to one terminal of the control inductor, the second terminal being connected to the other terminal of the control inductor, and the fourth terminal being connected to a junction joining the switching devices of the inverter; the breakdown network being activated when the sensing network senses a voltage across the control inductor in excess of a predetermined threshold voltage, the shutdown network being activated by turning on the switching circuitry thereof when a second predetermined threshold voltage is exceeded in order to provide restsrike pulses for re-activating the lamp, thereby short-circuiting the control inductor and de-activating the inverter until the lamp is sufficiently cool to re-activate the lamp.

9. The ballast of claim 8 wherein the sensing network comprises a diode rectifier network.

10. The ballast of claim 8 wherein the sensing network comprises a pair of diodes coupled together at their cathodes and further coupled such that the anode of one is coupled to the first terminal and the anode of the other is coupled to the second terminal, the sensing network further comprising integral body diodes of the switching circuitry.

11. The ballast of claim 8 wherein the breakdown network comprises a latching device, comprising two complementary transistors coupled such that the base of each is connected to the collector of the other, and further comprises a Zener diode and resistor connected in series with each other, the series combination of the Zener diode and resistor being coupled across the latching device.

12. The ballast of claim 8 wherein the shutdown circuit comprises a pair of switching devices in a half-bridge configuration between the third and fourth terminals, and further comprises an RC circuit.

13. The ballast of claim 8, further comprising an RC circuit for providing a time delay before activation of the latching network in order to avoid activating the shutdown network during standard lamp warm up.

14. The ballast of claim 8, further comprising timing circuitry for controlling the time interval between restrike pulses.

* * * * *